J. A. MOLLITOR.
CUSHION TIRE.
APPLICATION FILED AUG. 28, 1912.
1,081,765.
Patented Dec. 16, 1913.
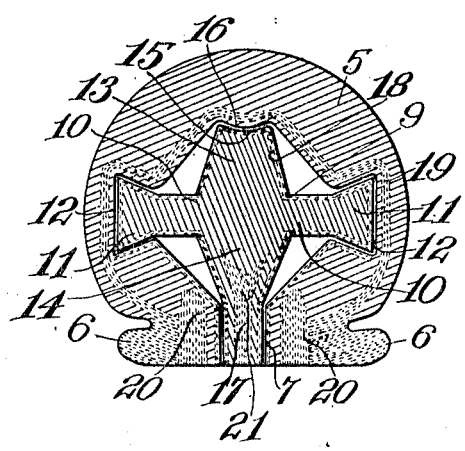
Inventor
Joseph A. Mollitor.
Witnesses

UNITED STATES PATENT OFFICE.

JOSEPH A. MOLLITOR, OF CHICAGO, ILLINOIS.

CUSHION-TIRE.

1,081,765. Specification of Letters Patent. Patented Dec. 16, 1913.

Application filed August 28, 1912. Serial No. 717,485.

*To all whom it may concern:*

Be it known that I, JOSEPH A. MOLLITOR, a citizen of the United States, residing at Chicago, in the county of Cook and State of Illinois, have invented certain new and useful Improvements in Cushion-Tires, of which the following is a specification.

This invention relates to cushion tires of that class which are characterized by an inclosed core, the invention being directed more particularly to the core, and having for its object to provide a core of novel form which is readily removable in order that it may be renewed when necessary.

The invention also has for its object to provide a novel and improved means for securing the core within the tire.

With these objects in view, the invention consists in a combination and arrangement of parts to be hereinafter described and claimed, reference being had to the accompanying drawing in which a cross-section of the tire and the inclosed core is shown.

Referring specifically to the drawing, 5 denotes the outer casing of the tire, the same having the usual clencher beads 6 at its base. The ends of the casing forming the base are spaced apart so that a space or opening 7 is produced which extends entirely through the base and communicates with the interior of the casing.

The casing 5 incloses a cruciform core 9 having lateral and oppositely extending wings 10, the extremities of which are flared or dovetailed, as indicated at 11, and seat in correspondingly shaped diametrically opposite grooves 12 in the side walls of the casing, on the inside thereof. The core also has top and bottom wings 13 and 14, respectively. The top wing 13 has a slight outward taper and extends in the direction of the tread portion of the casing, and is adapted to come in contact with the casing wall at this point, on the inside thereof. The extremity of the top wing has a depression 15 which coincides with a bead 16 formed on the inside of the casing wall. The bottom wing 14 extends toward the base of the tire, and has a reduced portion 17 which fits in the space 7.

The surface of the core 9 has a reinforcement 18, and the interior surface of the casing 5 also has a reinforcement 19, in order to reduce the wear between the contiguous portions of the casing and the core. The casing also has an embedded reinforcement 20 located in its base portion and extending along the sides of the casing, and also across the casing at the tread portion thereof, close to the interior of the casing. The wing 14 has an embedded reinforcement 21.

A core constructed and mounted in the tire casing as herein described is securely held in place therein, and at the same time it can be readily removed upon taking the tire off the clencher rim of the wheel. The reinforcement of the casing and the core produces a strong and durable tire, in which wear is reduced to a minimum.

I claim:

A cushion tire comprising an outer casing having its ends forming the base of the tire spaced apart, and a cruciform core inclosed in the casing, said core being separate from the casing and having an integral wing extending into the space between the ends of the casing at the base thereof.

In testimony whereof I affix my signature in presence of two witnesses.

JOSEPH A. MOLLITOR.

Witnesses:
 S. J. LEHRER,
 H. G. BATCHELOR.